United States Patent Office 2,920,711
Patented Jan. 12, 1960

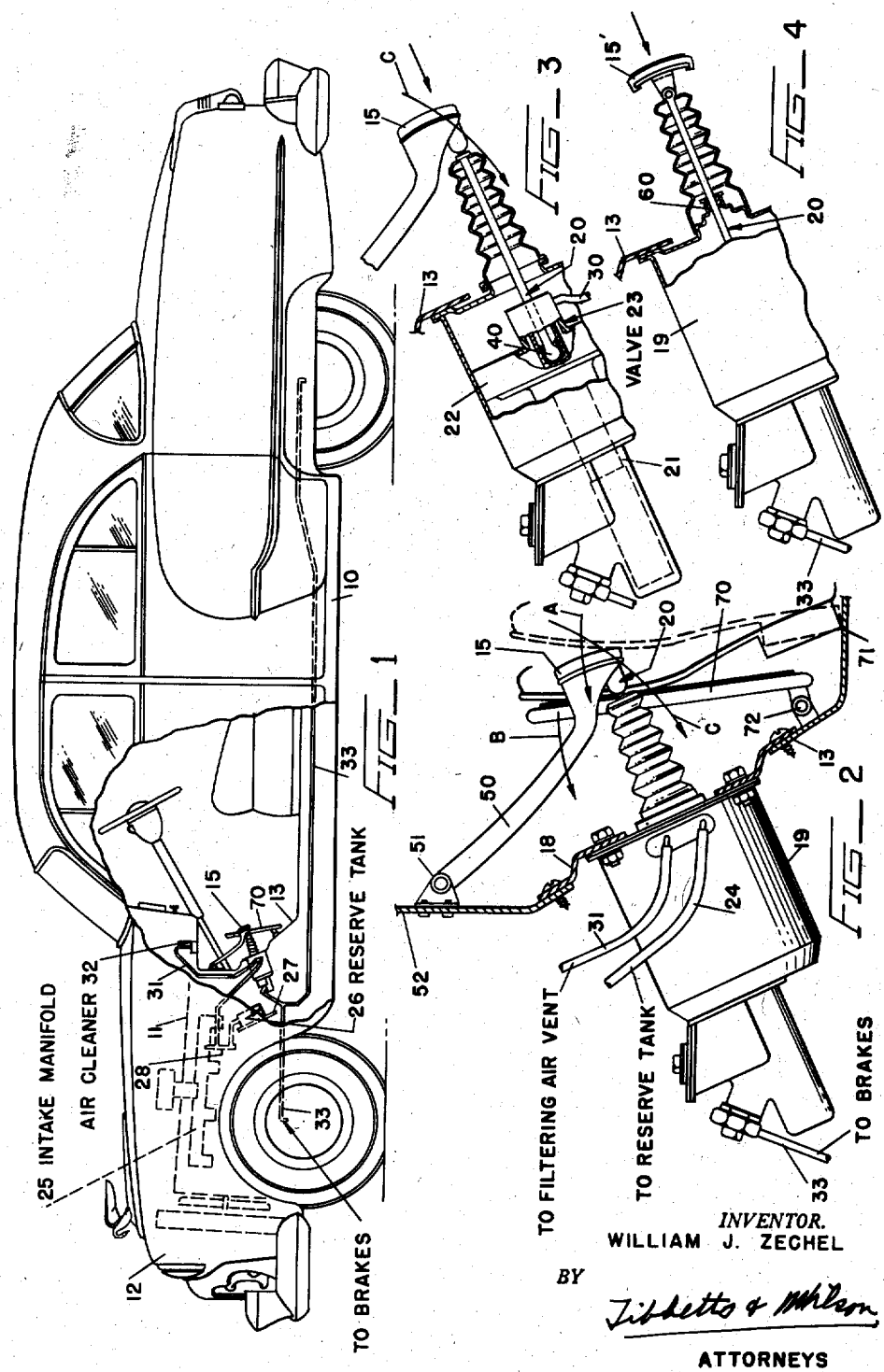

2,920,711

COMBINED BODY, BRAKE SYSTEM AND ACCELERATOR PEDAL ASSEMBLY

William J. Zechel, Detroit, Mich., assignor to Studebaker-Packard Corporation, a corporation of Michigan Application March 7, 1952, Serial No. 275,421

1 Claim. (Cl. 180—77)

This invention is concerned with the relative positioning of parts of the braking and accelerating systems of a motor vehicle and more particularly with the adaptation of a vacuum booster means to a pedal operated braking system, such as for example, the foot operated hydraulic brakes conventionally used on a passenger automobile. Vacuum means operated from the intake manifold of the engine of the car have previously been proposed for this purpose and this invention has for an object the provision of an improved mounting arrangement for the booster means wherein the brake pedal is positioned in close proximity to the accelerator pedal of the car so that the necessary motions required to effect actuation of the brakes are minimized in order that the brakes can be applied more quickly and the vehicle stopped within a shorter distance.

The construction also provides for a mounting of the master cylinder of the hydraulic braking system and the piston motor of the vacuum operated booster in a suitable housing carried on the underside of the toe board or floor adjacent the front seat of the car. With this construction, the housing for the brake operating means is situated within the motor compartment of the vehicle near the lower end of the steering column where it may be reached conveniently for servicing.

Preferably, the hydraulic piston in the master cylinder and the vacuum operated piston of the booster means are both carried on the lower end of a composite piston rod structure, the two pistons being guided to have a straight line reciprocating motion within the housing to effect operation of the brakes. The upper end of the composite piston rod structure includes a valve for controlling the operation of the booster motor and has an extending end portion that passes through an aperture in the toe board of the vehicle for connection to the brake pedal.

In one form of the invention, the upper end of the composite piston rod is guided in a suitable slide bearing support and the pedal for operating the brakes is formed integral with the free upper end of the rod. The lower end of the piston rod is supported by the pistons, and thus the combination of the motion of the pistons and the guiding action of the slide bearing, constrains the composite piston rod to a straight line motion.

In another form of the invention the pedal is carried at the lower end of the relatively long overhanging lever that guides the pedal, during its working stroke, through a rather flat arc whereby substantially straight through alignment may be maintained between the piston support portion of the piston rod and the upper portion of the rod connected to the pedal. With this construction, the upper valve actuating end of the rod is preferably articulated to the piston supporting end so that it may swing through a small arc while the pistons themselves are confined to a straight line motion.

The booster system as above stated, is designed for operation from the vacuum created in the intake manifold of the engine of the car. The system includes a relatively large vacuum reserve tank that may be vacuumized to provide a stand-by low pressure capacity for energizing the booster mechanism whenever the degree of vacuum in the manifold is not sufficient to create the necessary pressure differential to operate the booster motor. The reserve tank is mounted on any convenient part of the body adjacent the toe board of the front seat compartment and is connected to the manifold of the motor through a vacuum line having a suitable check valve therein. With this arrangement, an emergency source of vacuum is assured by reason of the continuous pulling of a vacuum on the reserve tank whenever the manifold has a lower pressure than that existing in the tank.

In operating the brake system, foot pressure is applied to the brake pedal and the valve of the booster motor is actuated whereby to produce a vacuum in the motor such that its piston is driven in a manner to assist in the application of a working pressure on the hydraulic brake system. While, with such means, a substantial portion of the power required for operation of the brakes is supplied by the booster, it should be noted, that the size of the motor is selected such that a large proportion of the pressure needed for operating the brakes is developed by the foot pressure exerted by the operator on the pedal in order to give the operator the "feel" of the brakes.

Reference may be had to the drawings and the specification below for a more detailed description of the preferred form of the invention. It is to be understood, however, that the invention is not limited in its application to the details of construction and arrangement of part which are described and it will be obvious too that the invention is capable of being embodied in other forms and of being practiced or carried out in various ways. The phraseology or terminology employed herein is for the purpose of description only and is not used by way of limitation.

In the drawings:

Fig. 1 is a side elevation of a motor vehicle showing the relationship of the various parts of the improved assembly forming the subject of this invention;

Fig. 2 is a side elevation of one form of the brake pedal mounting;

Fig. 3 is a side elevation partly broken away of the mechanism of Fig. 2, showing in more detail a portion of the composite piston rod structure; and Fig. 4 is a side elevation of a modified form of pedal mounting.

Referring to Fig. 1, the body 10 of the vehicle is shown, the car having a motor 11, a fender 12, and a sloping toe board 13 which forms a portion of the floor of the front seat compartment of the body. The toe board slopes upwardly and forwardly to separate the driving compartment of the body from the motor compartment of the vehicle and a brake pedal 15 is positioned over the toe board in a convenient position near the accelerator for operation by the driver.

The invention herein disclosed may be used with any form of foot operated braking mechanism, however, in many modern automobiles, a hydraulic braking means is used and this invention is shown as applied to such a fluid actuated system.

The booster system is fixed to a support plate 18 and includes a housing 19, the plate and housing assembly being removably affixed to the vehicle body so that the housing extends downwardly from the plane of the underside of the toe board 13. Within the housing there is reciprocally mounted a composite piston carrying rod 20 and the upper end of the rod extends through a suitable aperture in plate 18 so that it projects above the toe board. The upper end of the rod 20 is cooperatively connected to the pedal and with this simplified construction, the booster cylinder and master cylinder may be quickly assembled on the car using a minimum number of parts and, further, the operating elements of the composite brake system are positioned for easy servicing in a relatively clean and dust-free portion of the motor compartment. It will be noted that plate 18 may be disassembled from its position on the upper surface of toe board 13 and the housing and plate assembly may be quickly lifted from the car as soon as the hydraulic and power connections are broken so that replacements may be easily made if necessary.

As indicated in Fig. 3, the piston rod 20 takes the form of a composite structure for supporting a hydraulic piston 21 at its lower end and the piston 22 of the booster motor approximately centrally thereof. The hydraulic piston is adapted to drive the hydraulic fluid to the brake actuating means and the booster motor piston may be driven to supply a portion of the power required for operating the brakes. The lower half of the composite piston supporting rod 20 provides a rigid support for the two pistons while the upper half of the rod is resiliently separated therefrom so that depending upon the inward pressing force applied by the operator, a valve mechanism 23 is actuated more or less to effect application of the vacuum to the booster motor. This structure will be described more fully below.

The booster motor shown herein is of well known construction and may be connected through vacuum line 24 directly to the intake manifold 25 of the automobile, or to the vacuum reserve tank 26 if the pressure in the intake manifold is too high for efficient operation of the booster motor. The vacuum reserve tank is supported behind the generally vertically disposed panel 27 formed integral with the fender 12 and the vacuum reserve tank is connected to the intake manifold 25 through line 28 and a vacuum condition is continuously produced in the reserve tank while the motor operates under normal conditions such that a relatively low pressure exists in the intake manifold. A suitable check valve may be located in the line 28 to hold the vacuum in the reserve tank if the pressure should rise in the intake manifold. The vacuum line 24 leading to the booster motor is connected to line 28 through a suitable T connection, the T being located between the tank and the check valve in line 28 so that the motor can be driven even though the pressure momentarily prevailing in the intake manifold is not sufficiently low to operate the booster motor.

Inside the housing 19, the hydraulic cylinder or master cylinder of the brake system, and the booster cylinder are spaced lengthwise along and are arranged generally concentrically about the common axis along which the lower half of the piston rod 20 reciprocates. Within the upper portion of housing 19, the line 24 connects with a flexible pipe 30 that leads to the valve means 23 mounted in the composite rod 20. Normally, the valve is resiliently urged to a closed position which vents the cylinder of the vacuum motor to the atmosphere through line 31 leading to the air strainer 32 preferably mounted just behind the instrument panel of the motor vehicle.

When the operator applies a pressure to pedal 15, the valve 23 is opened to the vacuum line 24 and a vacuum condition is created in the cylinder of the booster motor below the piston to energize the booster motor. The application of pressure is also operative to transmit a driving force through the composite bar 20 to the hydraulic piston in the hydraulic master cylinder so that the necessary operating pressure is produced at each of the lines 33 leading to the brake means on the several wheels of the vehicle. Continued application of foot pressure on the part of the operator, causes the valve to remain open to produce a continual withdrawal of air from the cylinder in the booster motor which tends to drive the booster piston and the composite piston rod and its associated hydraulic piston farther downwardly to assist the operator in effecting the application of the hydraulic brakes. Depending upon the size of the booster piston and cylinder, any degree of assistance desired can be attained, however, in actual practice, the use of the booster motor for the production of about 40% of the required energy for operating the brakes has been found desirable in order to leave enough of the actual foot pressure in the hydraulic braking system to preserve the "feel" of the brakes to assist the driver in maintaining control of the vehicle.

The hydraulic and booster cylinders are preferably arranged in line as above explained and it is desirable that the lower end of the composite rod 20 have a straight line reciprocal motion within housing 19. Such a motion is preferred in order to minimize frictional engagement between the pistons and the walls of the cylinders so that the brake actuating means will not bind during operation.

As shown in the form of the invention represented in Figs. 1, 2 and 3, the composite rod 20 includes an upper half having a ball and socket connection 40 with the lower half of the rod to form an articulated connection so that pedal motion may be transmitted to the valve and lower section of the rod without exerting any distorting forces to interfere with the straight line reciprocating motion of the pistons in their respective cylinders. As best shown in Fig. 2, the pedal 15 is preferably mounted at the lower end of an overhanging lever, link or support arm 50 which is pivotally supported on the bearing 51 fixed to the upper portion of the rear of the fire wall 52. The link or lever 50 is relatively long so that the arc of movement of pedal 15 is generally flat and thus throughout its working stroke, the pedal 15 moves in a curved path that is nearly flat to drive the upper end of the composite piston rod 20 inwardly.

In the form of the invention shown in Fig. 4, the upper end of the composite rod 20 is guided through a suitable slide bearing 60 carried fixedly in the upper end of the housing 19 so that the entire length of the composite piston rod 20 moves in a straight line. When this bearing construction is used, the pedal 15' may be mounted fixedly upon the upper end of composite rod 20 and the overhanging link or support arm 50 may be eliminated.

The toe board mounting of housing 19 and the several pedal structures together form one aspect of this invention while another is concerned with the combination of elements which may be made, wherein advantage is taken of the shorter pedal stroke, by positioning of the pedal closely adjacent to the accelerator pedal 70. Because a power booster means is utilized, in part, to effect operation of the braking system, the hydraulic piston 22 and the master cylinder 21 can be designed so that the working stroke of the composite piston rod 20 can be considerably shortened. Thus, the pedal motion may be minimized. With a shorter working stroke, the brake pedal may be positioned relatively close to the toe board and yet have a sufficient length of movement to travel completely through its working stroke. In the preferred construction of this invention, the brake pedal is positioned in a place close to, but slightly above, the average operating position of the foot on the accelerator under normal driving conditions so that the operator need merely swing his foot from the accelerator position to the brake pedal position with a slight movement to the rear, thereby minimizing the time and effort required to cause application of the brakes. The time saved in positioning the foot on the pedal together with the shorter stroke and the mechanical assistance produced by the power means, accomplishes a full application of the brakes in approximately a third less time as compared with the time required for applying the conventional foot powered braking means now used on passenger cars.

When either form of pedal mounting is used with this invention, the composite piston rod structure is caused to move inwardly with a relatively straight line motion. However, the overhanging pedal supporting arm 50 is preferred in order to maintain a more positive control of the brake pedal motion and also to produce a characteristic feel in the motion of the pedal. It is obvious, since the pedal is pivoted from above, on a lever that extends downwardly and toward the rear, that it will swing downwardly and forwardly on an arc as contrasted with the accelerator which is pivoted from below. Referring to Fig. 2, it is apparent that the foot of the operator will swing through an arc A about point 71 to drive the accelerator downwardly through its arc of movement B about pivot 72. When the foot is applied to the brake pedal 15, the foot will still generally swing through an arc such as A while the pedal 15 swings downwardly along the path indicated by arc C. The pivot points 71 and 72 are positioned rather closely together and therefore the arcs A and B define almost concentric paths of movement. On the other hand the radius of the path of movement for pedal 15 extends downwardly from pivot point 51 whereas the radius of movement for the operator's foot about point 71 extends upwardly therefrom, and a perceptible relative movement takes place between the pedal 15 and the operator's foot during inward travel as evidenced by the intersecting arcs A and C. This appreciable difference in relative motion between the accelerator 70 and pedal 15 as compared with the motion of the operator's foot, is useful and important as an aid in identifying the accelerator and brake pedal after one becomes accustomed to their respective motions.

As above stated, the preferred form of the invention and one possible modification thereof have been shown herein and it is apparent that modifications thereof may occur to those skilled in the art which will fall within the scope of the following claim.

I claim:

In a motor vehicle having a body with a toe board therein, running gear for said vehicle, and a brake means and booster system, said system including a housing having a relatively large cross sectional size and means for mounting the housing from the toe board, said toe board having an aperture therein, said aperture having a cross sectional size larger than that of said housing, a plate for covering said aperture, said plate being removably mounted upon the upper surface of said toe board, and said housing being fixed to the underside of said plate whereby said plate may be removed from said toe board and the housing passed through said aperture.

References Cited in the file of this patent

UNITED STATES PATENTS

| | | |
|---|---|---|
| 1,472,801 | Loughead | Nov. 6, 1923 |
| 1,531,467 | White | Mar. 31, 1925 |
| 1,533,093 | Booth | Apr. 14, 1925 |
| 1,781,868 | Bragg et al. | Nov. 18, 1930 |
| 2,018,023 | Kliesrath | Oct. 22, 1935 |
| 2,023,674 | Fawick | Dec. 10, 1935 |
| 2,250,033 | Porter | July 22, 1941 |
| 2,365,960 | Ingres | Dec. 26, 1944 |
| 2,372,842 | Mossinghoff | Apr. 3, 1945 |
| 2,517,005 | MacDuff | Aug. 1, 1950 |
| 2,685,170 | Price | Aug. 3, 1954 |